(12) United States Patent
Simofi-Ilyes et al.

(10) Patent No.: US 7,034,416 B2
(45) Date of Patent: Apr. 25, 2006

(54) VENTED END CAP WITH INTEGRATED SPLASH SHIELD FOR PERMANENT MAGNET DC MOTOR

(75) Inventors: Attila Simofi-Ilyes, London (CA); Shan Mugan, London (CA); Andrew Lakerdas, London (CA)

(73) Assignee: Siemens VDO Automotive Inc., London ( * ) Notice: Subject to any disclaimer, the term of this patent is extended or adjusted under 35 U.S.C. 154(b) by 0 days.

(21) Appl. No.: 11/032,965

(22) Filed: Jan. 11, 2005

(65) Prior Publication Data

US 2005/0168080 A1    Aug. 4, 2005

Related U.S. Application Data

(60) Provisional application No. 60/540,117, filed on Jan. 29, 2004.

(51) Int. Cl.
*H02K 9/00* (2006.01)
(52) U.S. Cl. .......................................... 310/58; 310/89
(58) Field of Classification Search ............ 310/52–59, 310/62, 89, 91
See application file for complete search history.

(56) References Cited

U.S. PATENT DOCUMENTS

| | | | |
|---|---|---|---|
| 2,074,067 A | 3/1937 | Darnell | |
| 2,404,979 A | 7/1946 | Mueller et al. | |
| 2,743,385 A * | 4/1956 | Potter | 310/157 |
| 3,250,926 A | 5/1966 | O'Reilly et al. | |
| 3,308,317 A | 3/1967 | Allenbaugh | |
| 3,725,706 A | 4/1973 | Lukens | 310/62 |
| 3,800,173 A | 3/1974 | Rosenberry, Jr. | 310/59 |
| 4,086,507 A | 4/1978 | Roland et al. | 310/88 |
| 4,215,285 A | 7/1980 | Lewis | 310/90 |
| 4,384,224 A | 5/1983 | Spitler et al. | 310/81 |
| 4,535,262 A | 8/1985 | Newberg | 310/88 |
| 5,006,742 A | 4/1991 | Strobl et al. | 310/88 |
| 5,045,736 A | 9/1991 | Amano et al. | 310/88 |
| 5,243,244 A | 9/1993 | Kasberger et al. | 310/88 |
| 5,610,456 A | 3/1997 | Wille et al. | 310/58 |
| 6,239,521 B1 | 5/2001 | Lee | 310/62 |
| 6,294,852 B1 | 9/2001 | Lee | 310/52 |
| 6,384,494 B1 * | 5/2002 | Avidano et al. | 310/58 |
| 6,552,464 B1 | 4/2003 | Rahbar et al. | 310/239 |
| 2002/0175573 A1 | 11/2002 | Hayashi | 310/54 |

\* cited by examiner

Primary Examiner—Thanh Lam

(57) ABSTRACT

A permanent magnet D.C. electric motor 36 includes a motor housing 29 having first and second ends. The second end 42 is substantially closed and has an end of a shaft 35 extending there from. The second end includes vent holes 20 therein. The first end 27 is substantially open. An end cap 31 closes the first end of the housing. The end cap 31 has venting holes 34 therein for permitting air to pass therethrough to cool the motor. A splash shield 32 is integral with the end cap 31 and covers the venting holes 34 in such a manner to limit foreign matter from entering the venting holes while permitting air to flow through the venting holes.

11 Claims, 5 Drawing Sheets

VENTED END CAP WITH INTEGRATED SPLASH SHIELD FOR PERMANENT MAGNET DC MOTOR

This applicant is based on U.S. Provisional Application No. 60/540,117, filed on Jan. 29, 2004 and claims the benefit thereof for priority purposes.

FIELD OF THE INVENTION

This invention relates to permanent magnet DC motors and, more particularly, to a vented end cap of a motor having an integrated splash shield.

BACKGROUND OF THE INVENTION

With reference to FIG. 1, ventilation of a conventional engine cooling permanent magnet DC brush motor 10 is shown. The airflow path through the motor 10 is indicated by the curved lines A. Air is drawn through the motor 10 via venting holes 12 (FIG. 2) in the end cap 14. A fan hub 16 with fins 18 (FIG. 4) creates a low pressure region at the stator end 21 such that hot air from the motor 10 is drawn out through vent holes 20 in the stator 22 (FIG. 3). Although not shown in FIG. 1, it can be appreciated that the hub 16 is mounted to the fan adaptor plate 25 and provides some splash protection to holes 20.

The conventional vented motor configuration may not fulfill muddy-water spray test requirements stipulated by some auto manufacturers. An excessive amount of mud can enter the motor through the holes 12 and can eventually form a very abrasive and poor conductive layer on the top of the commutator bars. Furthermore, solidified mud can seize the brush in the brush tube. Consequently, the applied voltage is not being conveyed to the armature winding and thus, the motor can stop operating.

In the past, when a splash shield was required, it was integrated into a plastic module. This configuration was accomplished by closing an opening on the plastic module at the motor end cap side. However, this type of configuration limited the motor mounting to a plastic shroud to front mount only. Furthermore, a larger axial space is required for such module/motor and fan assembly.

There are also a variety of different closed end cap motor configurations available on the market. However, the closed end cap motor power level is limited to low or medium power depending on the durability requirements specified by the auto manufacturers.

Thus, there is a need to provide splash coverage to venting holes of a vented end cap for a motor.

SUMMARY OF THE INVENTION

An object of the invention is to fulfill the need referred to above. In accordance with the principles of the present invention, this objective is achieved by providing an assembly for a permanent magnet DC motor including a vented end cap constructed and arranged to be mounted to an opened end of the permanent magnet DC motor so as to close the opened end. The end cap has venting holes for permitting air to pass there-through to cool the motor. A splash shield is integral with the end cap and is constructed and arranged to cover the venting holes in such a manner to limit foreign matter from entering the venting holes while permitting air to flow through the venting holes.

In accordance with another aspect of the invention, a permanent magnet D.C. electric motor includes a motor housing having first and second ends. The second end is substantially closed and has an end of a shaft extending there from. The second end includes vent holes therein and the first end is substantially open. An end cap closes the first end of the housing. The end cap has venting holes therein for permitting air to pass there-through to cool the motor. A splash shield is integral with the end cap and covers the venting holes in such a manner to limit foreign matter from entering the venting holes while permitting air to flow through the venting holes.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
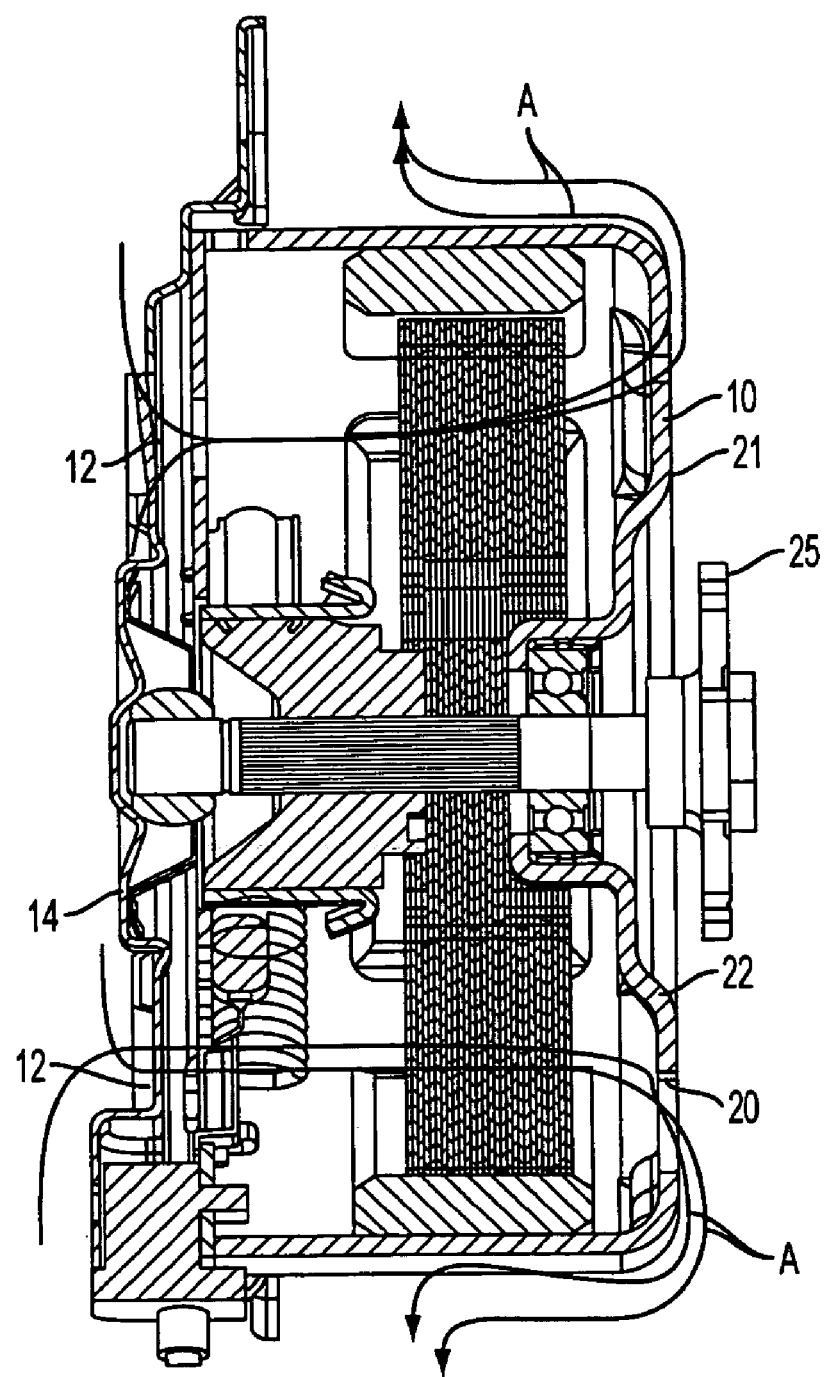
FIG. 1 is a sectional view of a conventional permanent magnet DC motor with venting.
Figure 5:
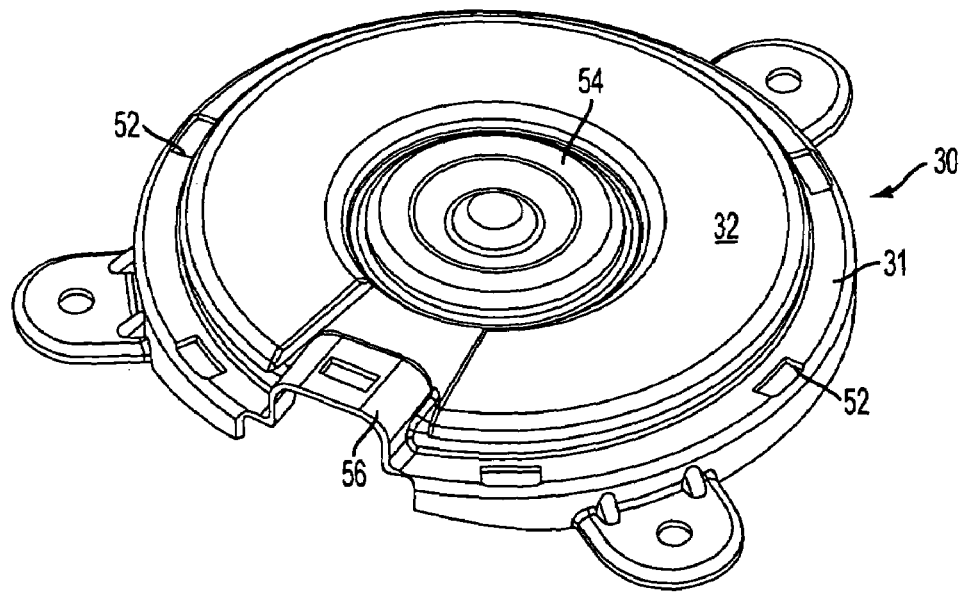
FIG. 5 is a perspective view of a vented end cap with integrated splash shield in accordance with the principles of the invention.
Figure 6:
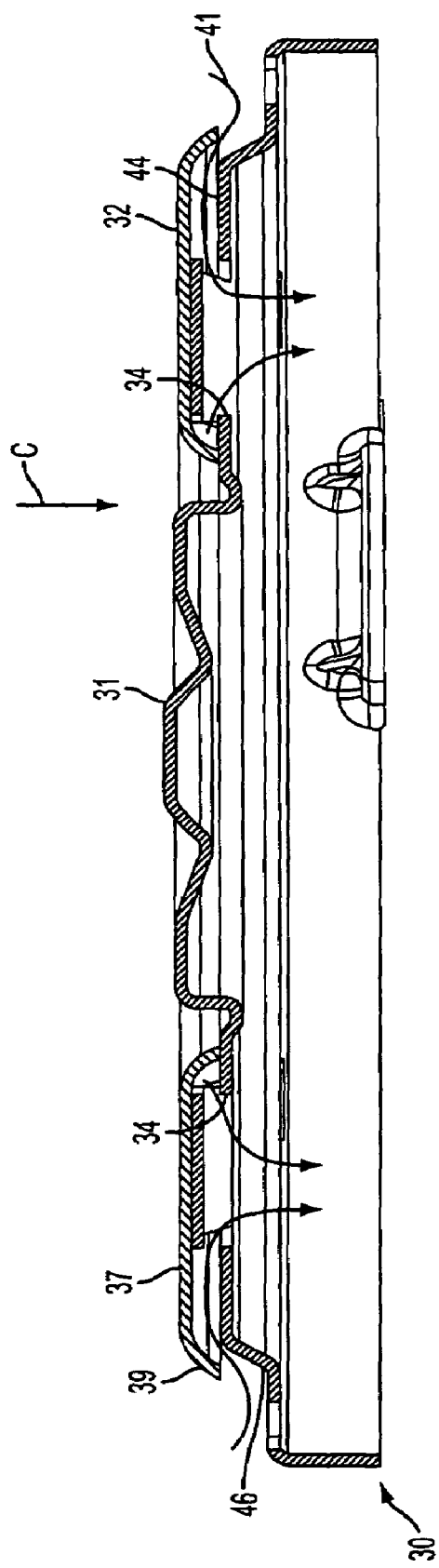
FIG. 6 is a sectional view of the vented end cap with integrated splash shield in accordance with the principles of the invention.
Figure 7:
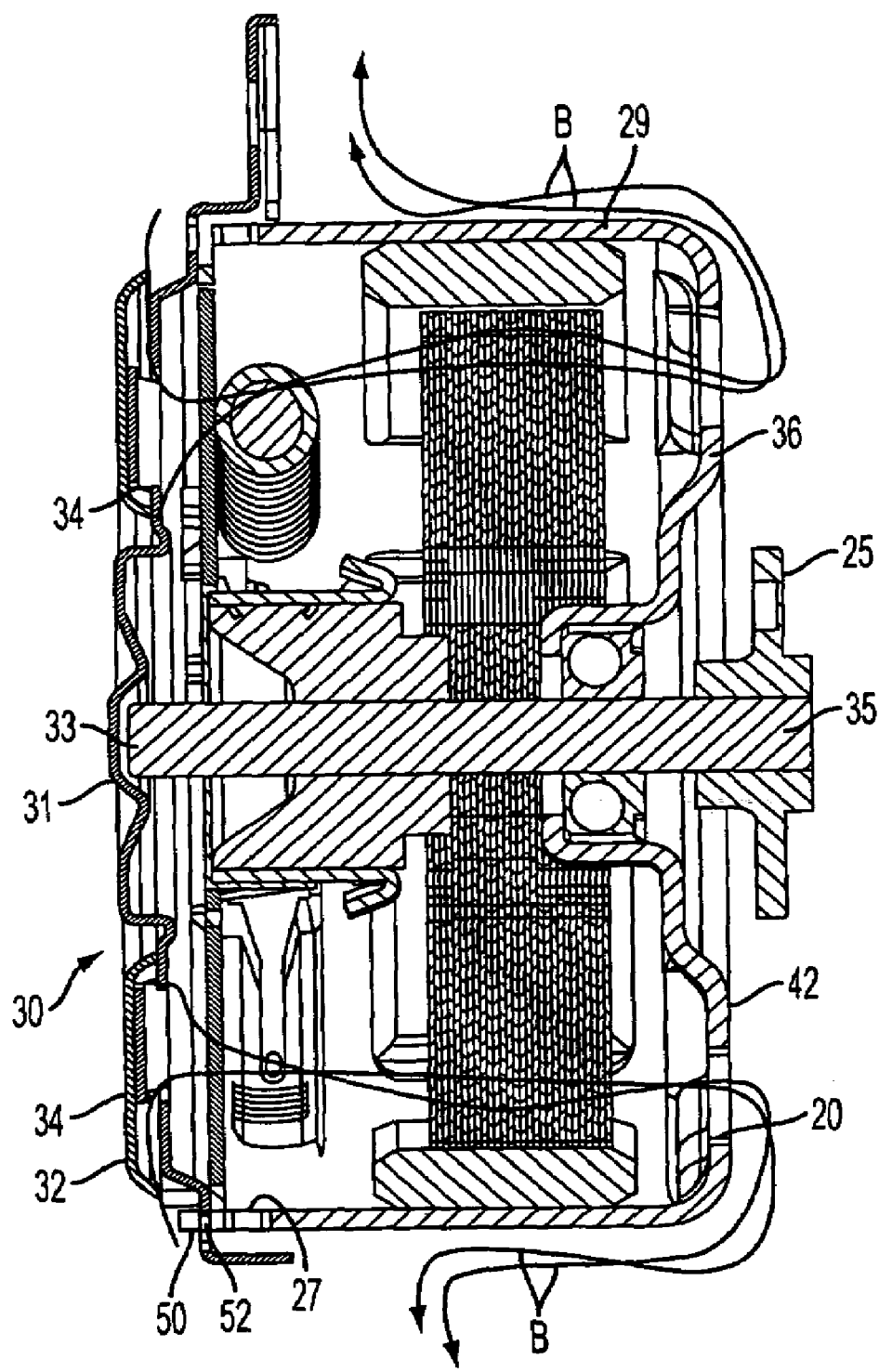
FIG. 7 is sectional view of a permanent magnet DC motor employing the vented end cap with integrated splash shield of the invention, shown without a bearing at the end cap end of the motor.

With reference to FIGS. 5–7 an end cap with integrated splash shield assembly is shown generally indicated at 30. The assembly 30 includes a vented end cap 31, covering or closing a first, opened end 27 of a housing 29 of a motor 36, and an integrated splash shield 32. The housing 29 of the permanent magnet DC motor 36 has a substantially closed second end, considered the stator end 42 and a shaft 35 mounted for rotation extending from the stator end 42. The stator end 42 can be considered to be identical to that of FIG. 1, having vent holes 20 therein for venting the motor.

Figure 4:
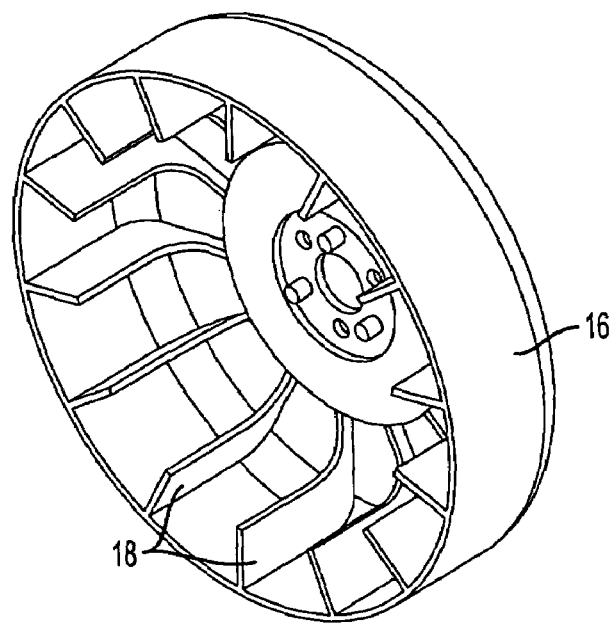
FIG. 4 is a perspective view of the conventional fan hub of the motor of FIG. 1, shown without the fan blades attached for clarity of illustration.

A bearing (not shown) under the end cap 31 supports an end 33 of a shaft 35 of the motor 36. The other end of the shaft 35 includes an adapter plate 25 for mounting a fan hub 16 (FIG. 4) thereto. As in the embodiment of FIG. 1, in the embodiment of FIG. 7, low pressure created by the fins 18 of the fan hub 16, when mounted to the adapter plate 25, causes air to flown into the venting holes 34 in the end cap 31, through the motor 36, and out the vent holes 20 in the stator end 42.

In order to secure the end cap 31 to the housing 29, as shown in FIGS. 5 and 7, the housing 29 has tabs 50 extending from the end thereof that are received in openings 52 in the end cap 31. The tabs 50 are staked or deformed to secure the end cap 31 to the housing 29.

Figure 2:
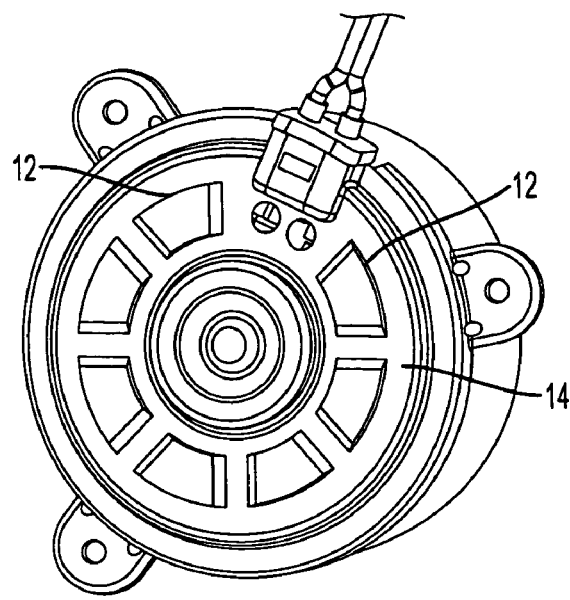
FIG. 2 is a perspective view of the conventional motor of FIG. 1, showing the end cap end thereof.
Figure 3:
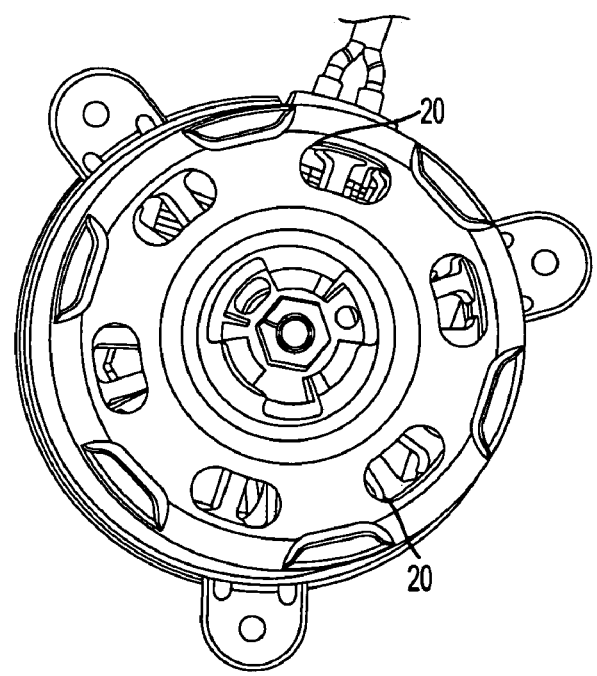
FIG. 3 is a perspective view of the motor of FIG. 1, showing the stator end thereof.

The splash shield 32 provides slash coverage to the end cap venting holes 34 and will allow air to pass into the motor 36 (FIG. 7). In the embodiment, the venting holes 34 are provided in the end surface 44 of the end cap 31. The venting holes 34 are preferably similar to the venting holes 12 of FIG. 2. Therefore, the assembly 30 can be used for higher power applications where splash shield 32 is required. More importantly, when the splash shield 32 is not required, the end cap 31 can be used without the splash shield component. This flexibility will allow removing a component from the system when splash shield it is not required, thereby lowering cost.

As best shown in FIG. 6, the splash shield 32 includes a generally planar portion 37 and a generally annular lip 39 extending from the planar portion toward the end cap 31. Thus a gap 41 is provided between the end cap 31 and the splash shield 32 to permit air to pass there-through and into the venting holes 34, while making it difficult for debris to enter the venting holes 34. More particularly, the end cap 31 includes a generally annular wall 46 and the lip 39 defines another generally annular wall spaced from the wall 46 of the end cap 31, thereby defining the gap 41. To reduce material and thus weight, the splash shield 32 is preferably of generally C-shape, covering only the end cap portion having the venting holes 34. Thus, the splash 32 need not cover the central portion 54 or connector portion 56 of the end cap 31.

The splash shield 32 can be attached to vented end cap 31 by any of the following methods (but not limited thereto):
1. Welding process (such as spot welding)
2. Staking or riveting
3. Crimping
4. Insert molding
5. Material displacement or folding
6. Gluing FIG. 7 shows the assembly 30 mounted to a permanent magnet DC motor. The arrows B in FIG. 7 show the airflow path through the venting holes 34 underneath the splash shield 32 and through the motor 36. FIG. 7 illustrates that the proper airflow path is being maintained as shown in the conventional motor of FIG. 1. The assembly 30 can also be used when heat shielding is required.

Thus, the assembly 30 provides a vented end cap with and integrated splash shield and can be used for both front and rear mount electric motors for automobile applications such as engine cooling. The shield 32 can limit foreign matter, for example, splashing water, dust, and mud from entering the venting holes 34 and thus the motor 36.

It can be appreciated that the direction of the ventilating air may be reversed or changed with respect to arrows B by, for example, 1) providing a different fan hub 18 configuration (such as: the orientation of the fins in the fan hub and/or opening holes on the front face of the fan hub) 2) the application/mounting type of fan module onto the engine cooling radiator in the vehicle; (the end cap of the motor is facing upstream or downstream to the ram air and airflow from the fan).

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An assembly for a permanent magnet DC motor, the assembly including:
   a vented end cap constructed and arranged to be mounted to an opened end of the permanent magnet DC motor so as to close the opened end, the end cap having venting holes for permitting air to pass there-through to cool the motor, and
   a splash shield integral with the end cap and covering the venting holes in such a manner to limit foreign matter from entering the venting holes while permitting air to flow through the venting holes,
   wherein the splash shield is of generally C-shape and covers only a portion of the end cap that includes the venting holes.

2. The assembly of claim 1, wherein the splash shield includes a generally planar portion and a generally annular lip extending from the planar portion toward the end cap so as to define a gap between the end cap and the splash shield to permit air to pass there-through and into the venting holes.

3. The assembly of claim 2, wherein the end cap includes an generally annular wall and the lip defines another generally annular wall spaced from the wall of the end cap, thereby defining the gap there-between.

4. A permanent magnet D.C. electric motor comprising:
   a motor housing having first and second ends, the second end being substantially closed and having an end of a shaft extending there from, the second end including vent holes therein, the first end being substantially open,
   an end cap closing the first end of the housing, the end cap having venting holes therein for permitting air to pass there-through to cool the motor, and
   a splash shield integral with the end cap and covering the venting holes in such a manner to limit foreign matter from entering the venting holes while permitting air to flow through the venting holes,
   wherein the splash shield is of generally C-shape and covers only a portion of the end cap that includes the venting holes.

5. The motor of claim 4, wherein the splash shield includes a generally planar portion and a generally annular lip extending from the planar portion toward the end cap so as to define a gap between the end cap and the splash shield to permit air to pass there-through and into the venting holes.

6. The motor of claim 5, wherein the end cap includes an generally annular wall and the lip defines another generally annular wall spaced from the wall of the end cap, thereby defining the gap there-between.

7. The motor of claim 4, wherein the first end of the housing includes tabs extending there from, the end cap having openings therein for receiving the tabs, the tabs being constructed and arranged to be deformed to secure the end cap to the housing.

8. A permanent magnet D.C. electric motor comprising:
   a motor housing having first and second ends, the second end being substantially closed and having an end of a shaft extending there from, the second end including vent holes therein, the first end being substantially open, an end cap closing the first end of the housing, the end cap having venting holes therein for permitting air to pass there-through to cool the motor, and means, integral with the end cap, for covering the venting holes in such a manner to limit foreign mailer from entering the venting holes while permitting air to flow through the venting holes, wherein the splash shield is of generally C-shape and covers only a portion of the end cap that includes the venting holes.

9. The motor of claim 8, wherein the means for covering is a splash shield including a generally planar portion and a generally annular lip extending from the planar portion toward the end cap so as to define a gap between the end cap and the splash shield to permit air to pass there-through and into the venting holes.

10. The motor of claim 9, wherein the end cap includes an generally annular wall and the lip defines another generally annular wall spaced from the wall of the end cap, thereby defining the gap there-between.

11. The motor of claim 8, wherein the first end of the housing includes tabs extending there from, the end cap having openings therein for receiving the tabs, the tabs being constructed and arranged to be deformed to secure the end cap to the housing.

* * * * *